P. O'THAYNE.
Ironing-Machine.
No. 7,937. Reissued Nov. 6, 1877.
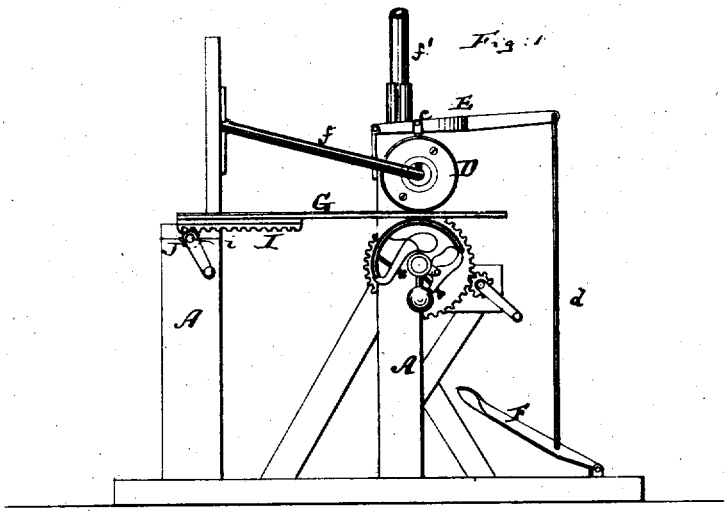
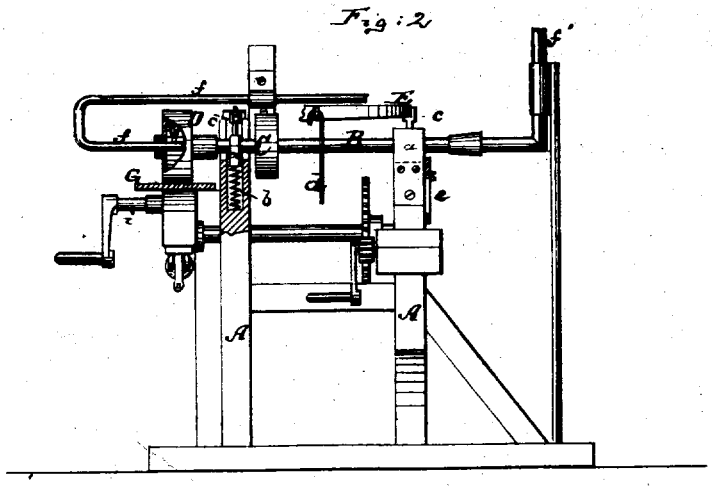
Witnesses:
John C. Tunbridge.
J. B. Briesen.
Inventor:
Patrick O'Thayne
by his attorney
A. v. Briesen

UNITED STATES PATENT OFFICE.

PATRICK O'THAYNE, OF NEW YORK, N. Y.

IMPROVEMENT IN IRONING-MACHINES.

Specification forming part of Letters Patent No. 63,301, dated March 26, 1867; Reissue No. 7,937, dated November 6, 1877; application filed July 25, 1877.

DIVISION B.

*To all whom it may concern:*

Be it known that I, PATRICK O'THAYNE, of the city, county, and State of New York, have invented a new and Improved Ironing-Machine; and I do hereby declare that the following is a full, clear, and exact description thereof, which will enable others skilled in the art to make and use the same, reference being had to the accompanying drawings, forming part of this specification, in which—

Figure 1 represents a side elevation of this invention, and Fig. 2 a sectional end view of the same.

Similar letters of reference indicate like parts.

This invention relates to a machine for ironing clothes or articles of any description, said machine being composed chiefly of a movable flat board, in combination with a smoothing-iron which is heated by a gas-flame so arranged that it can be depressed on the board, and revolved, if it should be desirable.

A represents a frame made of wood or any other suitable material. In the upper part of this frame are fitted two boxes, *a*, which rest on springs *b*, so that they are yielding, and which form the bearings for the shaft. On this shaft is mounted a pulley, C, and cylindrical smoothing-iron, D, so that by a belt passing over said pulley a rotary motion is imparted to said smoothing-iron.

From the boxes *a* rise two standards, *c*, which are pivoted to a forked lever, E, that is hung in suitable brackets attached to the frame A, and connected by a rod, *d*, with a treadle, F, so that by pressing on said treadle the boxes *a*, together with the shaft and smoothing-iron, are depressed on the board or platform G, which supports the articles to be ironed. The smoothing-iron D is mounted on one end of the shaft B, and in order to compel the same to beat down firmly and evenly on the board G, an adjustable rest, *e*, is attached to the frame A, under that end of the same which is opposite to the smoothing-iron. Said smoothing-iron is heated by a gas-flame, the requisite supply of gas being introduced through a pipe, *f*, and the products of combustion are carried off through the shaft B, which is hollow, and connects with the chimney *f'*, as clearly shown in Fig. 2 of the drawing. By the gas-flame the smoothing-iron can be kept hot whether said iron is made to revolve or used stationary.

The board G is straight in the direction of its length and motion, and is provided with a toothed rack, I, which gears in a pinion, J, mounted on a shaft, *i*, so that by means of said shaft a reciprocating motion can be imparted to the board, and articles fastened thereon can be exposed to the action of the smoothing-iron.

The operation of this machine is very simple, and will be readily understood from the foregoing description.

Instead of the rotating iron D, I may use a stationary smoothing-iron, and apply the pressure to the bottom of the platform or board by means of springs, screws, or other devices.

Having thus described my invention, I claim as new and desire to secure by Letters Patent—

The straight reciprocating ironing-board G, combined with the revolving smoothing-iron, which is adapted to be heated, the axis of said iron being placed parallel to the upper surface of said ironing-board, substantially as herein shown and described.

PATRICK O'THAYNE.

Witnesses:
F. v. BRIESEN,
J. TURK.